United States Patent [19]

Willis et al.

[11] E Re. 31,225

[45] Reissued May 3, 1983

[54] SINGLE SWITCH ARRANGEMENT FOR ADJUSTING THE TIME BEING DISPLAYED BY A TIMEPIECE

[75] Inventors: Alan E. Willis, Stamford, Conn.; Paul Suppa, Somers, N.Y.

[73] Assignee: Timex Corporation, Waterbury, Conn.

[21] Appl. No.: 34,083

[22] Filed: Apr. 27, 1979

Related U.S. Patent Documents

Reissue of:

[64] Patent No.: 3,953,964
Issued: May 4, 1976
Appl. No.: 545,846
Filed: Feb. 13, 1975

[51] Int. Cl.[3] ..... G04C 17/00; G04C 9/00

[52] U.S. Cl. ..... 368/70; 368/188

[58] Field of Search ..... 368/69, 70, 185, 184, 368/187, 188

[56] References Cited

U.S. PATENT DOCUMENTS 3,810,356 5/1974 Fujita ..... 368/188
3,823,545 7/1974 Vittoz ..... 368/188
3,852,952 12/1974 Yittoz ..... 58/85.5 X
3,975,897 8/1976 Naito ..... 368/188
4,182,113 1/1980 Kashio ..... 368/70

*Primary Examiner*—Vit W. Miska
*Attorney, Agent, or Firm*—William C. Crutcher

[57] ABSTRACT

A one button-switch time display set and adjustment apparatus for an electronic timepiece having a digital electro-optic display. The (time) information being displayed is set or adjusted by depressing and holding depressed the buttonswitch which causes the display indicia, i.e. digit (s) and other time display intervals, each to flash or flicker separately in a predetermined order. If the button-switch is released while the segment to be adjusted is being interrogated, indicated by the flickering or flashing of that indicia, the interrogation operation or sequence is interrupted and that indicia continues to flicker. Depressing and holding depressed the button-switch again, for a predetermined time, causes updating of the interrogated indicia at a 1 HZ rate. Releasing the button-switch stops the updating of the selected display indicia and causes the timepiece to return to the normal running mode or operation.

3 Claims, 7 Drawing Figures

SINGLE SWITCH ARRANGEMENT FOR ADJUSTING THE TIME BEING DISPLAYED BY A TIMEPIECE

Matter enclosed in heavy brackets [ ] appears in the original patent but forms no part of this reissue specification; matter printed in italics indicates the additions made by reissue.

BACKGROUND OF THE INVENTION

This invention relates to digital electronic timepieces, and in particular to a push-button switch time set and adjustment arrangement.

A number of time correcting systems have been proposed such as described in U.S. Pat. No. 3,485,033 issued Dec. 23, 1969 to L. Langley, U.S. Pat. No. 3,762,152 issued Oct. 2, 1973 to F. Mary, U.S. Pat. No. 3,810,356 issued May 14, 1974 to K. Fujita and U.S. Pat. No. 3,834,152 issued Sept. 10, 1974 to I. Nishimura and A. Shimor.

In all these prior art systems, however, multiple switches are required to correct the displayed time. Obviously, the need for multiple switches increases the cost of the timepiece, requires display or case space, causes increased failure or breakage of the timepiece and complicates the procedure for adjusting the displayed time. By providing a timepiece having one control switch means for setting and adjusting the time being displayed, the inherent disadvantages of the prior art systems are substantially eliminated.

SUMMARY OF THE INVENTION

An electronic timepiece comprising an electrooptical display means having a plurality of indicia thereon for separately indicating different time intervals, a timekeeping circuit means coupled to said display means for actuating each indicia to visually display time information, one manually operated switch, and circuit means operated by said switch and coupled to the timekeeping circuit means and to the display indicia for effecting sequential and separate distinction of the indicia and for effecting separate and selective adjustment of the time information being displayed thereby by the switch being manually operated in a prescribed manner. The control means in addition to these control functions, i.e. selection and adjustment or setting of the separate time display indicia, may also control "shutdown" of the timepiece by shutting off of the oscillator to conserve power.

It is an object of the present invention, therefore, to provide a single manually operated control means for adjusting the time being displayed by an electronic timepiece having an electrooptic display.

It is a further object of the present invention to provide a time adjustment arrangement that eliminates the disadvantages of the time correction systems of the prior art.

It is another object of the present invention to provide a manually operated control means for distinguishing and adjusting selectively individual display indicia being displayed by an electronic timepiece having an electrooptic display.

It is still a further object of the present invention to provide a manually operated control means with associated electronic circuitry for distinguishing and adjusting and/or setting selectively individual display digits and indicia and for effecting, if desired, shutdown of at least the oscillator section of the timepiece. These functions being effected selectively upon manual operation of the control means in a prescribed manner.

Other objects and advantages will be apparent to those skilled in the art from the detailed description of the drawings.

The accompanying drawings diagrammatically illustrate an embodiment of the present invention by way of example. Like numerals refer to like parts throughout. The pin connection for the specific integrated circuit, using the pin designations shown in RCA Solid State Databook Series SSD-203A COS/MOS Digital Integrated Circuits 1973 edition, are provided.

DESCRIPTION OF THE PREFERRED EMBODIMENT

Figure 1:
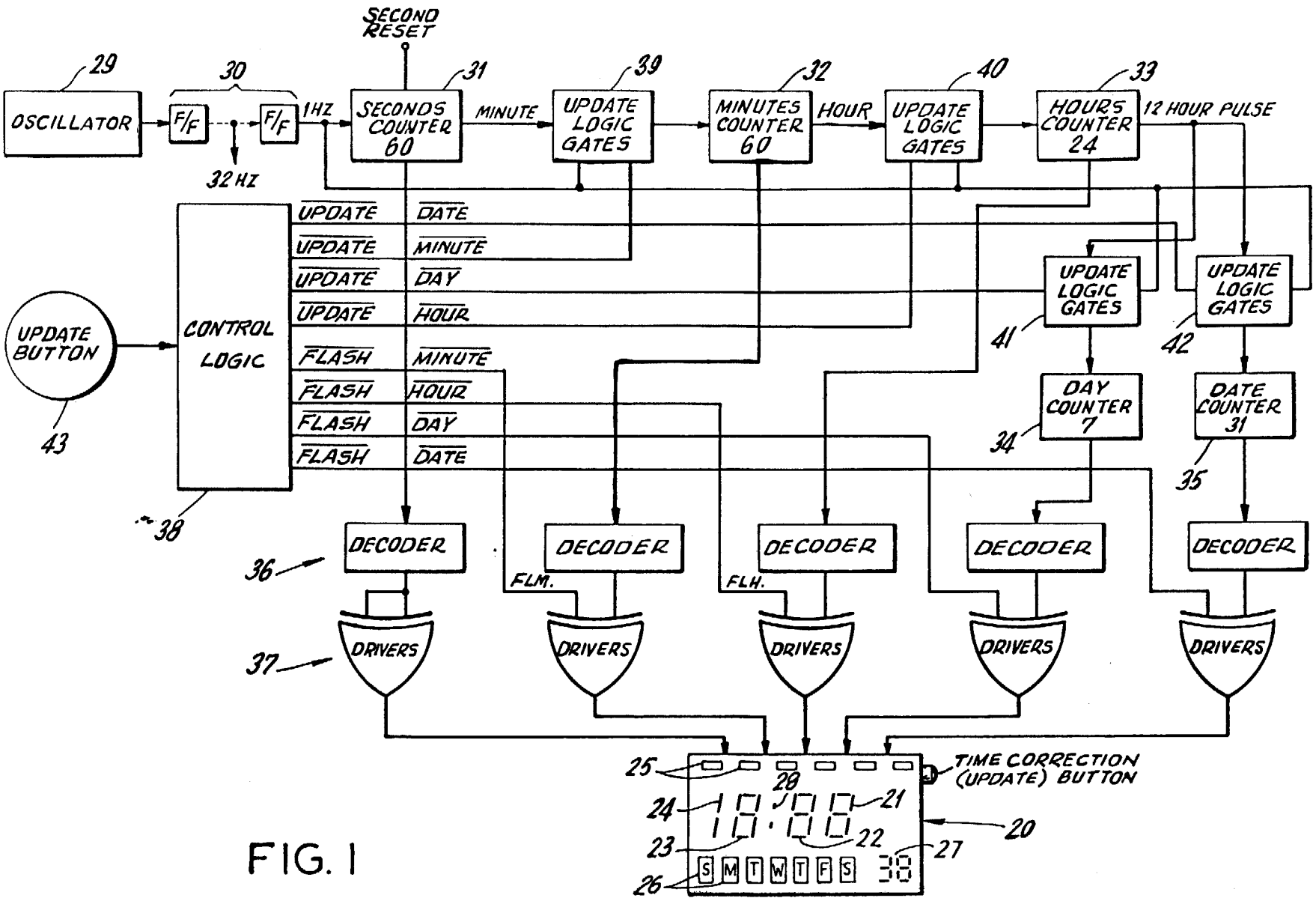
FIG. 1 is a block diagram of an electronic timepiece having apparatus for adjusting and setting the time information being displayed by a digital display timepiece.

Referring now to FIG. 1, a liquid crystal multi-indicia display alarm clock 20 is provided having displayed thereon unit minutes 21, tens of minutes 22, unit hours 23, tens of hours 24, tens of seconds 25, days 26 and the date 27 for purposes of illustration. It should be recognized, however, that other types of displays and timepieces such as electrochromic displays and electronic wristwatches could also be depicted as alternative embodiments.

The liquid crystal display has a total of six digits and two sets of bars. Four digits are in line, arranged in two groups of two digits each for the indication of hours 23, 24 and minutes 21, 22, respectively. A colon 28 separates the two groups. The seconds portion 25 of the display consists of six bars, each of which is excited for 10 seconds (0 to 10 . . . 50 to 60). The date portion 27 of the display has two digits for indicating a maximum of 31 days and seven indicia 26 such as bars or dots for indicating the day of the week. Each digit comprises seven conductive segments arranged in a figure eight pattern on a substrate. Each of the 7 day symbols and the seconds symbols are represented by one conductive segment. A second substrate spaced about 1 milimeter from the first substrate carries transparent electrodes in the form of a conductive coating. The space between the substrates is filled with a liquid crystal material. A numeral or symbol is displayed by applying a potential between a segment and a corresponding (facing) transparent electrode.

The display is actuated by a driving circuit which generally consists of an oscillator 29 controlled by a quartz crystal, a frequency dividing unit 30, counters 31, 32, 33, 34 and 35 and decoder/driver circuitry 36, 37.

There is also provided control and update logic 38, 39, 40, 41 and 42, actuated by a button-switch means 43 for effecting setting, resetting, correcting or adjustment of the display indicia 21 through 28 selectively.

Driving circuitry suitable for actuation of the display is known in the field such as is described in U.S. Pat. No. 3,258,906 issued July 5, 1966 to S. J. Demby, U.S. Pat. No. 3,333,410 issued Aug. 1, 1967 to A. M. Barbella and U.S. Pat. No. 3,579,976 issued May 25, 1971 to T. F. D'Muhala and, therefore, will not be described in detail herein to avoid prolixity. Briefly, however, with reference to FIGS. 1, 3, 4, 5 and 6, the oscillator is essentially an amplifier with a 4.194304 MHZ quartz crystal connected between the input and output. The frequency divider unit 30 is generally a series of "flip-flops" connected in tandem which provides a 1 HZ time base input to the seconds counter 31, and a liquid crystal excitation frequency such as 32 HZ. The 1 HZ signal is divided by 60 by the seconds counter 31 (shown schematically in FIG. 3) which provides a 1 minute pulse, i.e. a count of 60 seconds, to the minutes counter, via update logic gates 39, and generates the seconds count signal 10S. The seconds count signal 10S is coupled to logic circuitry (refer to FIG. 4) which provides control signals for actuating the seconds display 25 (shown in FIG. 1 as 6 ten-second bars 1–10 . . . 51–60). The 1 minute pulses are coupled to the minutes counter 32 which provides a unit and tens of minutes count to the decoder/driver logic 36, 37. Decoder/driver logic circuitry suitable for actuating the display is known in the field such as is described in the aforementioned prior art patents and, accordingly, will not be described in detail herein to avoid prolixity. Specific driver logic is shown in FIG. 6, however, to illustrate one arrangement by which the display digits and indicia are caused to flicker selectively. The display indicia, i.e. date, days, hours, minutes and if desired, the seconds, are caused to flicker by the application of a flicker control signal, i.e. FLDt, FLDa, FLH, FLM respectively, to the separate display indicia in a predetermined order or stepping (like) manner. The minutes counter 32 (shown in detail in FIG. 3) counts the number of pulses received from 0 to 59, provides a unit minutes and tens of minutes output count signal to the decoder/driver logic 36, 37, which actuates the display indicia 21 and 22 respectively, and provides via updapte logic gates 40 a 1 hour pulse, i.e. a 60 minute count output, to the hours counter 33. The hours counter 33 (shown schematically in FIG. 3) counts the number of hour pulses generated by the minutes counter 32 form 0 to 11 and provides a unit hours and a tens of hour count signal to the decoder/-driver logic 36, 37, which in response thereto actuates display indicia 23, 24 respectively. The 12 hour pulse output 12 H from the hours counter (refer to FIG. 3) and the 1 second pulse is coupled to the day counter 34 and the date counter 35 via update logic gates 41, 42 respectively (refer to FIG. 5 for schematic details). The output signals of the day and date counters 34, 35 are coupled to the decoder/drivers 36, 37 to actuate the appropriate display indicia 26, 27 respectively.

Figure 2:
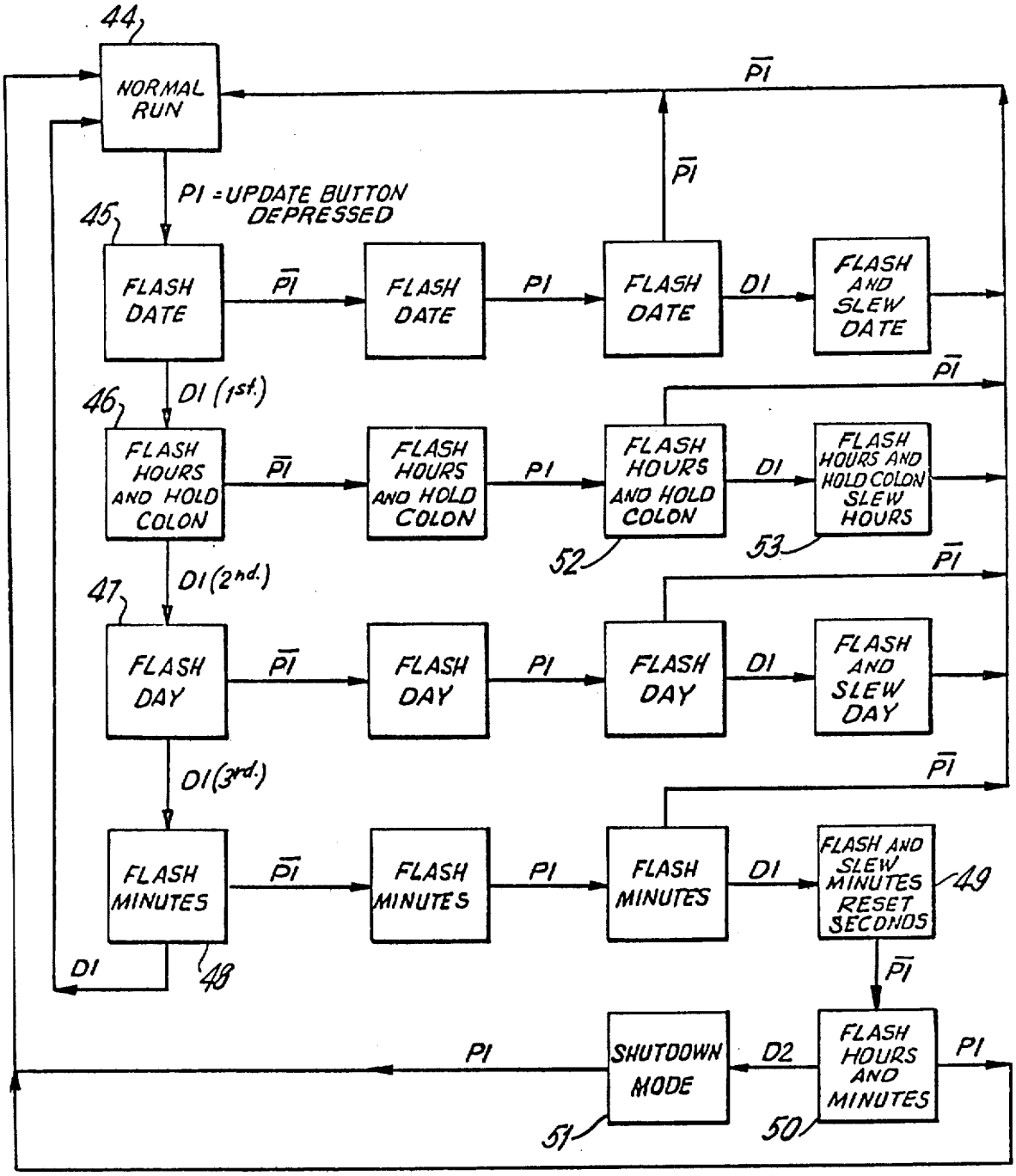
FIG. 2 is a block diagram or logic flow chart of the interrogation and updating and shutdown sequence effected by operation of the control button-switch in the illustrated prescribed manner.

Prior to a detailed discussion of the time adjustment circuitry 38 through 43 in accordance with the invention, reference is made to FIG. 2 to illustrate the sequence of logic steps performed by this circuitry when the push-button switch 43 is actuated in the prescribed manner.

First holding depressed the push-button switch 43 causes the date indicia 27 to start flashing. This is illustrated by logic step or block 45. After a predetermined fixed time period D1, such as 4 to 6 seconds, logic step 45 ends and logic step 46 begins. Logic step 46 comprises the flashing of the hours digits 23, 24 and the holding of the colon 28, which is normally flashing at a 1 HZ rate, in the on or actuated state to indicate "AM" or off to indicate "PM" time information. After a second D1 time period, logic step 46 ends and the events represented by logic step 47 begin. The events represented by logic step 47 consists of flashing the day indicia 26. After a third D1 time period, logic step 48 occurs which involves the flashing of the minute digits 21, 22. And after a fourth D1 time period, logic step 44 occurs returning the timepiece to its normal timekeeping mode or function.

The rate at which the display is flashed during these logic steps in approximately at a 1 HZ rate, for example on the $\frac{1}{8}$ second and off for $\frac{7}{8}$ second. And throughout the above logic steps of interrogating the separate display indicia, the timepiece continues to keep accurate time.

If the time correction push-button switch is released, depicted as $\overline{P1}$, while a display indicia is being interrogated, indicated visually by flashing of the indicia being interrogated, the interrogation sequence above described is interrupted and that display indicia which is being interrogated continues to be interrogated, i.e. continues to flash, for a predetermined prolonged time period. In this manner visual distinction of the selected display indicia is effected to indicate that that time display indicia can now be updated or corrected.

For example, if the push-button switch 43 is released while the hours digits 23, 24 are flashing, i.e. logic flow step 46, the hours digits are caused to flash for a prolonged time period, for example for an additional D1 time, to visually indicate that the hours display are being interrogated and can be updated. If the push-button switch 43 is not depressed to effect update during this prolonged flashing time, the timepiece is returned to the normal timekeeping mode. Holding depressed the push-button switch 43 again, i.e. logic step 52, causes the hours display digits to commence updating at the 1 HZ rate, i.e. logic step 53. Releasing the push-button switch 43 sets the hours digits at the time indication than being displayed and causes the timepiece to return to the normal run mode, i.e. logic step 44.

Updating of the date, days and minutes is effected in a similar manner. However, when correction or setting of the minutes digits is being effected, i.e. logic step 49, additional logic is provided to reset the seconds counter at zero.

If the push-button switch 43 is released while the minute digits are being updated 49, both the minute and hour display digits are caused to flash 50 thereby indicating the commencing of the shutdown mode, i.e. logic step 51. If left in this shutdown mode 51 for a predetermined time D2, for example 8 to 16 minutes, the timepiece will be shutdown. Depressing and releasing the push-button switch 43 again before the end of the D2 time period returns the timepiece to the normal run mode, i.e. logic step 44.

Figure 7:
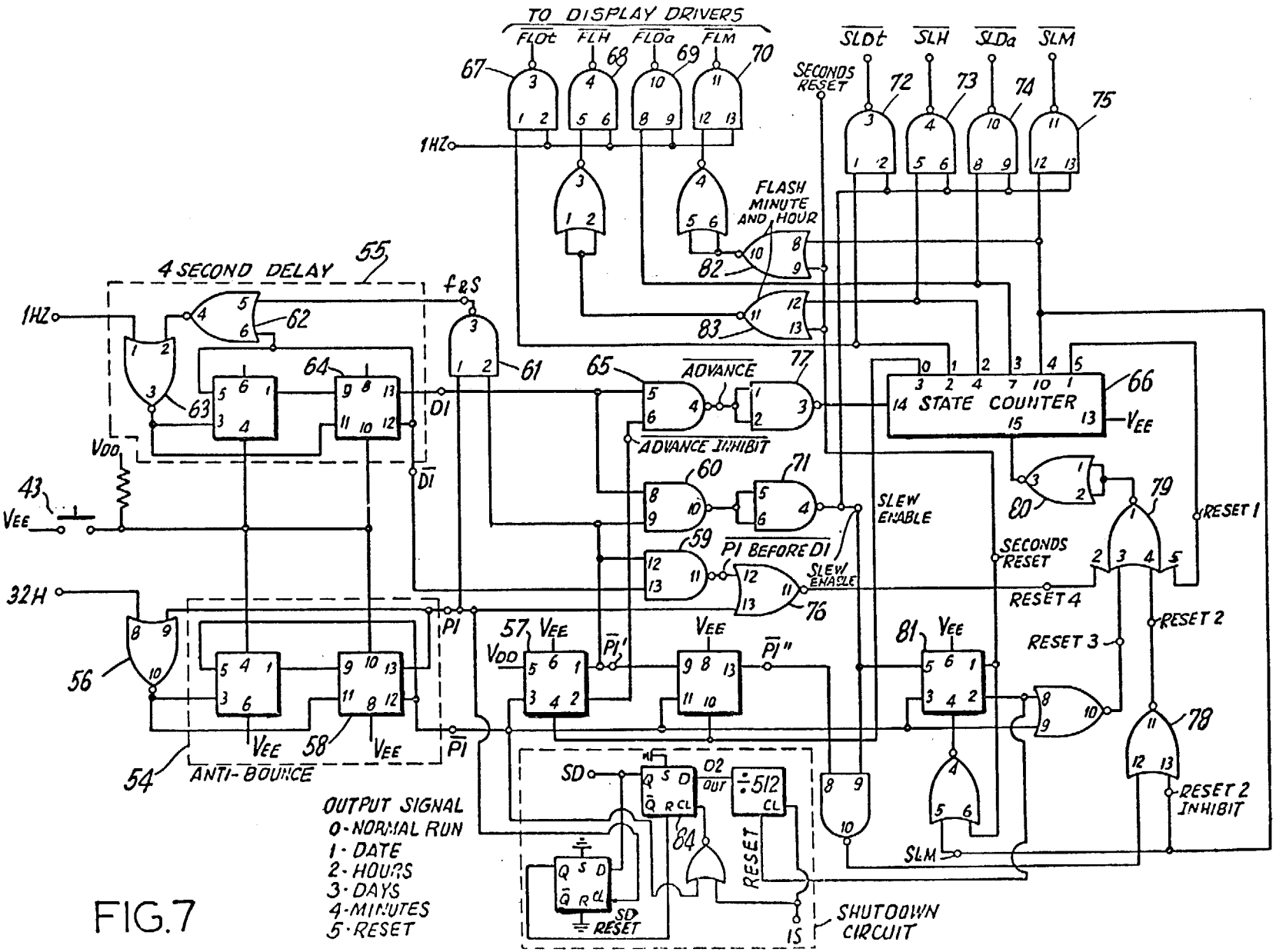
FIG. 7 is a circuit diagram of the control button-switch and associated circuitry in accordance with the invention.

The operation of the push-button switch 43 and associated control logic will now be explained in detail with reference to FIGS. 3, 5 and 7.

When the push-button switch 43 (refer to FIG. 7) is first held depressed VEE potential is applied to the reset (pin 4 and 10) of the flip-flops of the anti-bounce and the 4 second delay circuits shown within phantom outlines 54 and 55 respectively. This enables these circuits to be toggled at the 32 HZ and 1 HZ clock pulse rates respectively. The anti-bounce circuit divides down the 32 H pulses until the output on pin 13 of flip-flop 58 goes high, i.e. a logic "1" state, which disables the 32 HZ clock pulses to the anti-bounce circuit 54 by means of nor gate 56. At this time, therefore, pin 13 (Q) and pin 12 (Q) of flip-flop 58 are at a high and low logic level, respectively.

As long as the push-button switch 43 is first held depressed, the outputs of nand gates 61 and 71 and nor gates 62 and 76 are held at a logic "0" level by a low on pin 1 of flip-flop 57. This enables the 1 HZ pulse input signal on pin 1 of nor gate 63 to clock the 4 second delay circuit 55 which, in turn, provides a pulse-like output signal, at a 4 second rate, on pins 12 and 13 of flip-flop 64. The 4 second pulses on pin 13 of flip-flop 64 in conjunction with the high or logic "1" level output on pin 2 of flip-flop 57 causes advance of the state counter 66 through nand gates 65 and 77.

The state counter 66 counts the 4 second clock pulses from nand gate 77 and provides output enable signals 1 through 4, sequentially to an input of the flash nand gates 67 through 70 and to slew or update nand gates 72 through 75. Each enable signal, therefore, has a duration of approximately 4 seconds. The 1 HZ signal is coupled to the other input of each of the flash nand gates 67 through 70. The flash nand gates 67 through 70 when sequencially interrogated, i.e. enabled by the output enable signals 1 through 4 of the state counter, provide the flash enable signals $\overline{\text{FLDt}}$ (flash date), $\overline{\text{FLH}}$ (flash hours), $\overline{\text{FLDa}}$ (flash day) and $\overline{\text{FLM}}$ (flash minutes), respectively, at the 1 HZ signal rate. These signals are coupled to the respective display segment drivers for effecting sequential flashing or flickering of the respective display segments (refer to FIG. 6 for details of the driver circuitry).

If the push-button switch 43 is released from first being held depressed, the flip-flops of the anti-bounce and the 4 second delay circuits 54, 55 are reset causing the output on pin 12 of flip-flop 58 to go high, i.e. to a logic "1" state. The leading edge of this high pulse on pin 12 causes flip-flop 57 to toggle thereby providing on its output pins 1, 2 high and low logic levels respectively. The low logic level, i.e. a logic "0", on pin 2 is coupled to nand gate 65 which causes the advance of the state counter 66 to be inhibited and thereby causes the continued flashing, i.e. interrogation for updating, of the selected display indicia.

If the push-button switch 43 is held depressed a second time, the flip-flops of the anti-bounce and the 4 second delay circuits 54, 55, are again free to toggle. At the end of the anti-bounce countdown time, the output on pin 13 of flip-flop 58 is at a logic "1". Since, at this time, the output on pin 1 of flip-flop 57 is also at a logic "1", nand gate 61 is, thereby, rendered ineffective to disable the 1 HZ pulses through nor gate 63. And the 4 second delay circuit 55 continues to toggle until pin 12 of flip-flop 64 goes to a logic low (approximately after a 4 second delay) causing the output of nor gates 62 and 63 to, also go to a logic low, thereby, preventing continued toggling of the 4 second delay circuit 55 by the 1 HZ signal. The logic "1" or high on pin 13 of flip-flop 64 and on pin 1 of flip-flop 57 are coupled to nand gate 60 which causes a slew or update enable signal, via inverter nand gate 71, to be provided to an input of each of the slew nand gates 72 through 75.

The other input of each slew nand gate 72 through 75 is coupled to outputs 1 through 4 of the state counter 66, respectively, to which the corresponding flash nand gates 67 through 70 are coupled. For example, an input on nand gates 67 and 72 are coupled to the same output signal 1 (on pin 2) of the state counter 66. Since the advance of the state counter 66 is being inhibited, by means of nand gate 65, the display segment being interrogated, i.e. flashing or flickering by means of flash nand gates 67 through 70, is caused to be updated by a slew enable signal from one of the slew nand gates 72 through 75.

Figure 3:
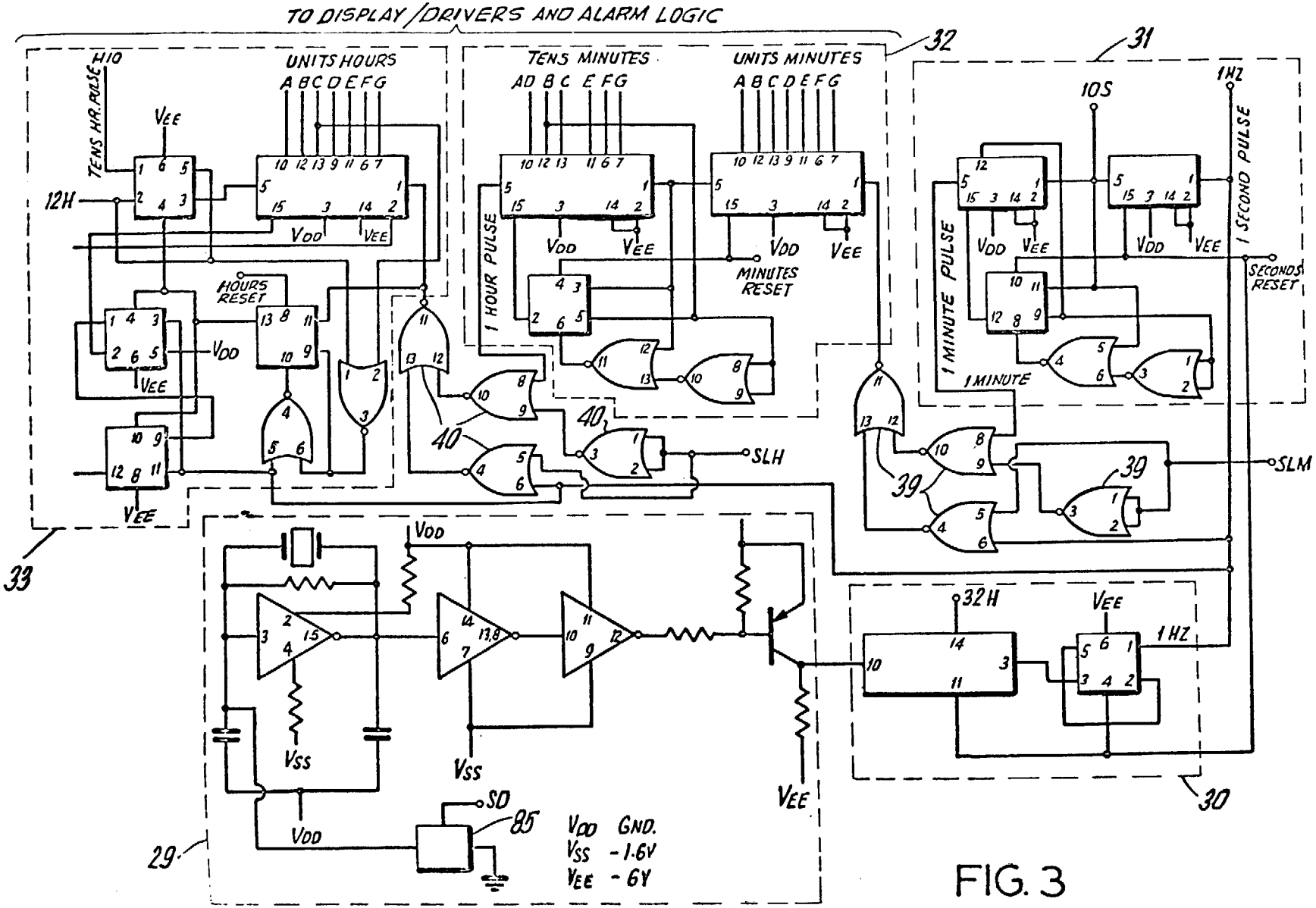
FIGS. 3, 4, 5 and 6 are circuit diagrams of the separate sections of the electronic timepiece shown in FIG. 1.
Figure 4:
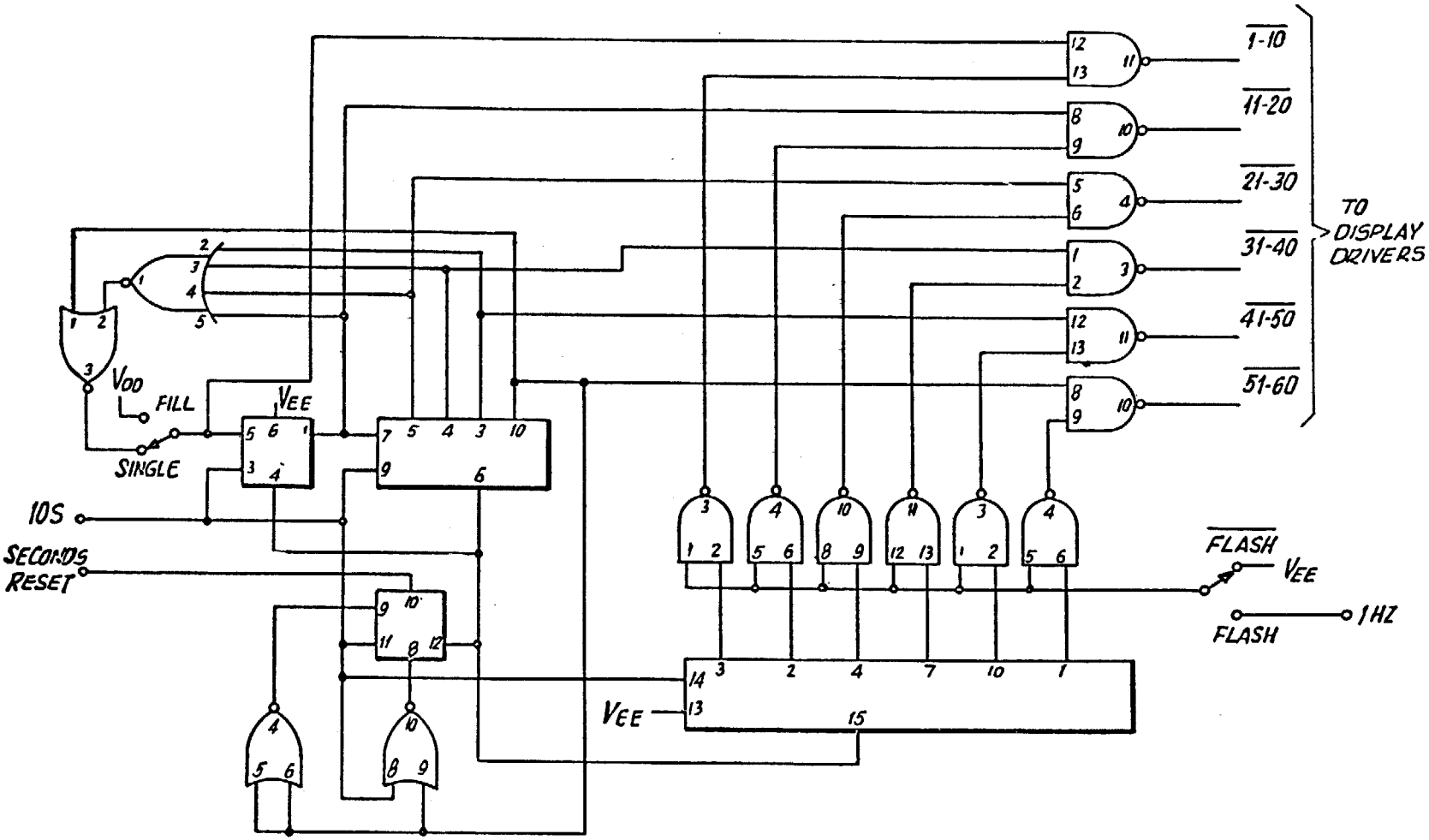
Figure 5:
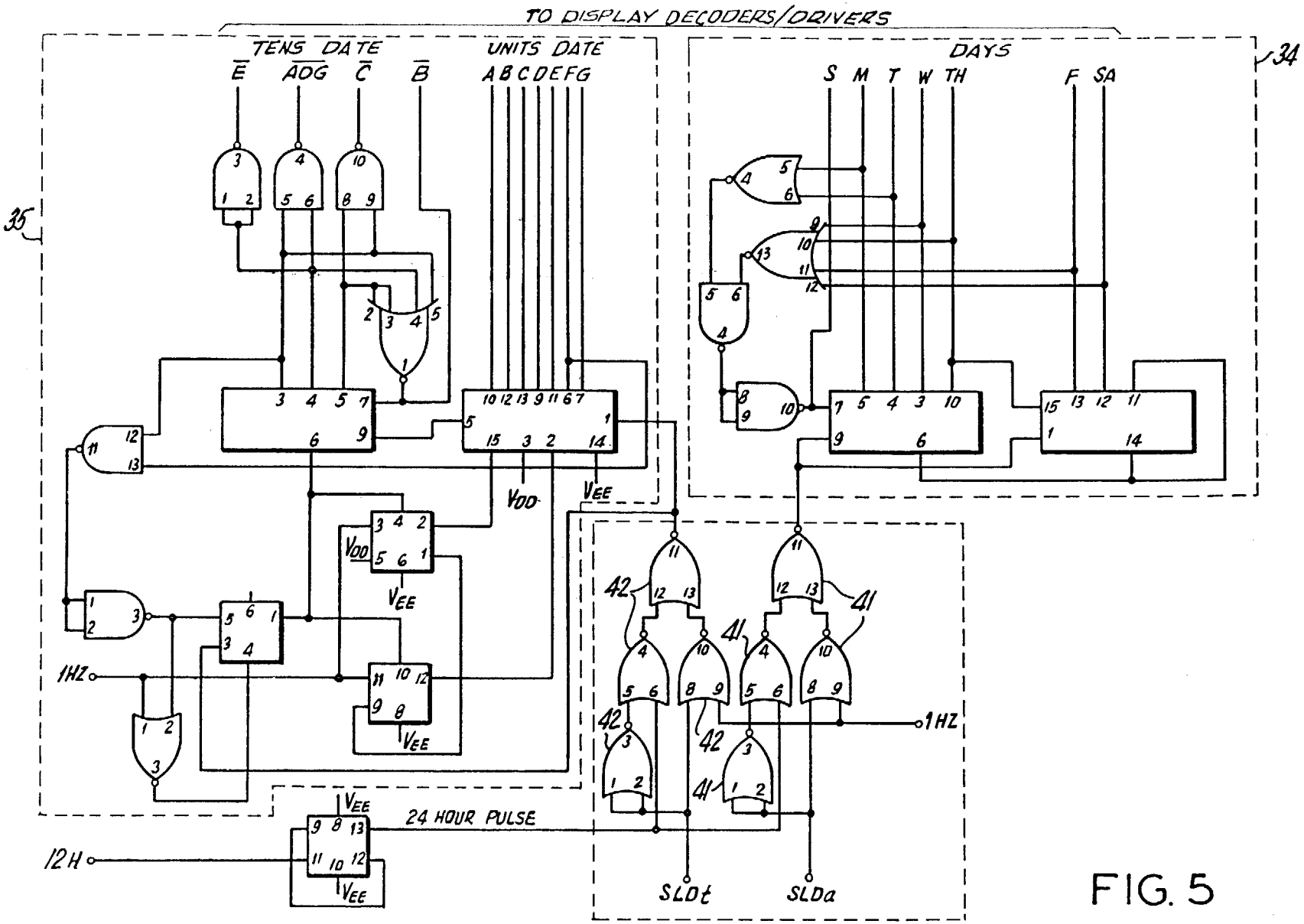
Figure 6:
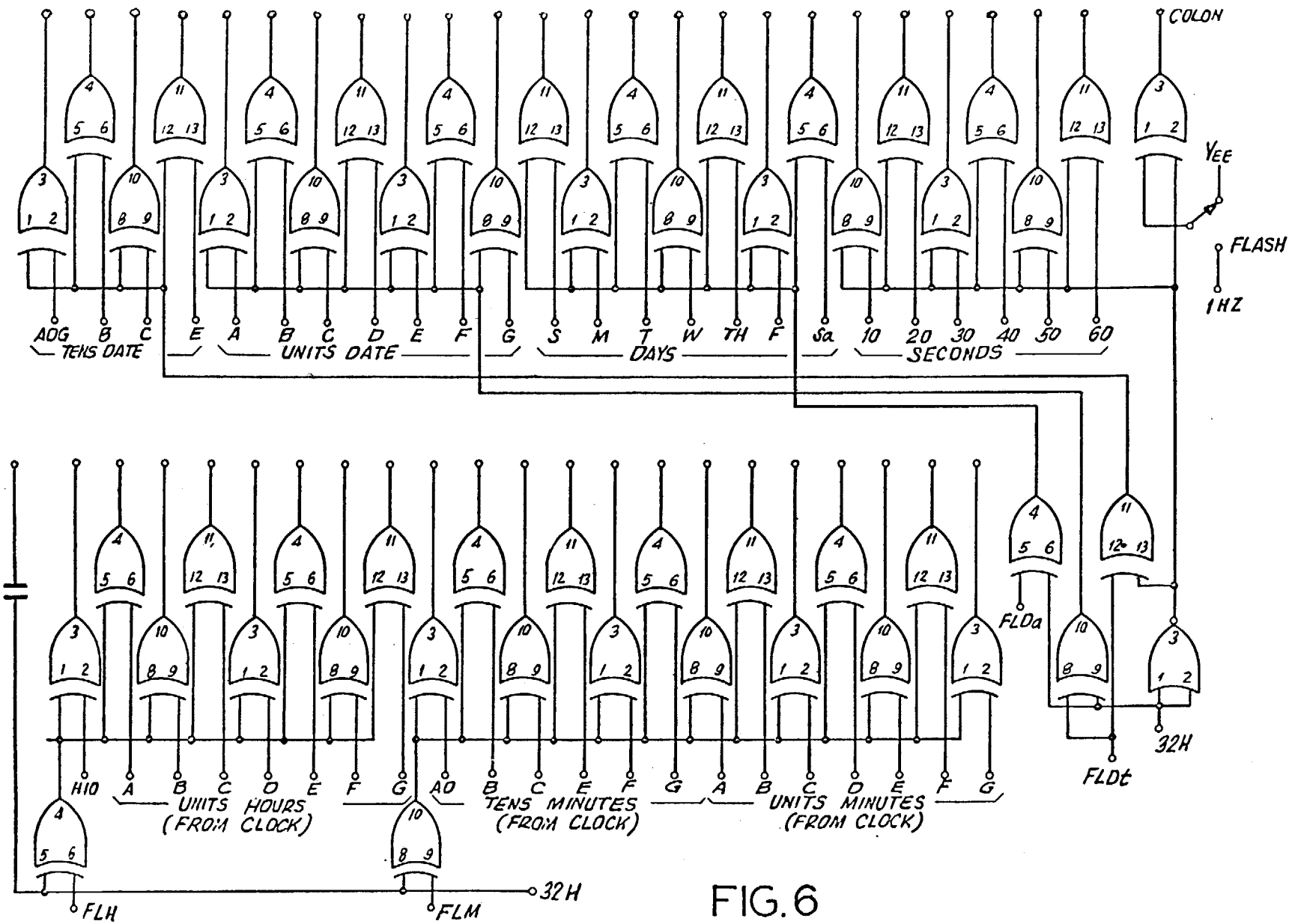

The slew or update signal, i.e. $\overline{\text{SLDt}}$ (slew date), $\overline{\text{SLH}}$ (slew hours), $\overline{\text{SLDa}}$ (slew days) and $\overline{\text{SLM}}$ (slew minutes), from the interrogated slew nand gate, i.e. having an enable signal or logic high on both of its inputs, is coupled to the counters 35, 33, 34, 32 respectively causing updating or setting of the selected display indicia via update gate logic circuits 42, 40, 41 and 39 respectively (refer to FIGS. 3 and 5 for details of the update gate and counter circuits). For example, if the outputs on pin 4 of nand gate 71 and pin 2 of the state counter 66 (output signal 1) are both at a high level, the output of slew nand gate 72 is at a low level. This logic low is coupled to pins 1, 2 and 8 of logic gate 42 (refer to FIG. 5) and causes the decoupling of the 24 hour pulse and coupling of the 1 HZ pulse (on pin 9) signals to the date counter input, thereby effecting update of the unit date counter and display at the 1 HZ pulse rate.

In all states of logic modes except slew minutes the reset 2 inhibit on pin 13 of nor gate 78 is low and the next release, i.e. the second release, of the push-button switch 43 resets the state counter 66 through nor gates 76, 79 and 80 and returns the timepiece to the normal run mode, i.e. an output logic "1" level on pin 3 of the state counter 66.

Shutdown of the timepiece is effected by the push-button switch 43 being released for the second time after minutes update and by maintaining the push-button switch at this position, without reactuation, for a predetermined time.

With the second release of the push-button switch 43, during update of the minutes, flip-flop 81 is toggled placing its output on pin 1 at a logic high level which enables nor gates 82, 83 and causes the minute and hour indicia to flash at the 1 HZ pulse rate. Therefore, with pin 2 of flip-flop 81 at a logic low, the divide by 512 flip-flop is enabled. If the push-button switch 43 is not depressed and released a third time within the predetermined time, for example the 512 seconds, the SD output, i.e. shutdown signal, of flip-flop 84 triggers transfer gate 85 (see FIG. 3) thereby causing shutdown of the oscillator 29.

To restart the timepiece after shutdown, the push-button switch is depressed and released again. This clocks flip-flop 84 to reset the SD signal.

We claim:

[1. An electronic timepiece comprising:

an electrooptical display means having a plurality of indicia thereon for separately indicating different time intervals;

a timekeeping circuit means coupled to said display means for actuating each indicia to visually display time information;

a manually operated switch having a single manually operated actuator; and circuit means operated by said switch and coupled to the timekeeping circuit means and to the display indicia for effecting sequential and separate distinction of the indicia and for effecting separate and selective adjustment of the time information being displayed thereby by the single manually operated actuator being manually operated in a prescribed manner.]

[2. An electronic timepiece as in claim 1 wherein: said actuator being a push-button.]

[3. An electronic timepiece as in claim 2 wherein: the circuit means effects sequential distinction of indicia being displayed by said push-button actuator being first operated to a first position, said circuit means effects selective distinction of indicia by the push-button actuator being first operated to a second position, said circuit means effects update of said selected indicia by the push-button actuator being secondly operated to said first position, said circuit means effects an end to the update of said selected indicia at a selected time being displayed and returns the timepiece to a normal timekeeping operation by the push-button actuator being secondly operated to said second position.]

[4. A digital electronic timepiece of the kind having a liquid crystal display comprising a series of individual display indicia for separate time intervals being coupled to timekeeping circuit means, wherein the improvement comprises:

a manually operated switch having a push-button actuator; and control circuit means operated by said switch means and coupled to the timekeeping circuit means and to the display indicia for effecting sequential and separate distinction of the separate time intervals being displayed and for effecting selective adjustment of said display time intervals by the push-button actuator being manually operated in a prescribed manner.]

5. A digital electronic timepiece having an electro-optical display consisting of a series of individual display indicia for separate time intervals being coupled to timekeeping circuit means comprising:

a manually operated push-button switch means;

control circuit means operated by said push-button switch means and coupled to said display indicia and said time-keeping circuit means for effecting sequential visual flashing of the display indicia by the push-button switch means being first held depressed, said control circuit means effects prolonged flashing of a selected indicia by the push-button switch means being first released, said control circuit means effects a change to the separate time interval being displayed by the flashing indicia by the push-button switch means being secondly held depressed, said control circuit means effects an end to the changing of the time interval selected for change and returns the timepiece to a normal timekeeping mode by the push-button switch means being secondly released when the selected time interval is being displayed.

6. A timepiece as in claim 5 wherein:

the control circuit means effects a shutdown of the timepiece by the push-button switch means being manually operated in a prescribed manner.

*7. An electronic timepiece comprising:*

*an electrooptical display means having a plurality of indicia thereon for separately indicating different time intervals;*

*a timekeeping circuit means coupled to said display means for actuating each indicia to visually display time information;*

*a manually operated switch having a single manually operated actuator; and*

*circuit means operated by said switch and coupled to the timekeeping circuit means and to the display indicia for effecting sequential and separate distinction of the indicia and for effecting separate and selective adjustment of the time information being displayed thereby by the single manually operated actuator being manually operated in a prescribed manner, wherein the circuit means effects sequential distinction of indicia being displayed by said push-button actuator being first operated to a first position, said circuit means effects selective distinction of indicia by the push-button actuator being first operated to a second position, said circuit means effects update of said selected indicia by the push-button actuator being secondly operated to said first position, said circuit means effects an end to the update of said selected indicia at a selected time being displayed and returns the timepiece to a normal timekeeping operation by the push-button actuator being secondly operated to said second position.*

* * * * *